April 21, 1942.        R. ANXIONNAZ ET AL        2,280,765
GAS TURBINE THERMIC ENGINE
Filed Dec. 8, 1936        7 Sheets-Sheet 1
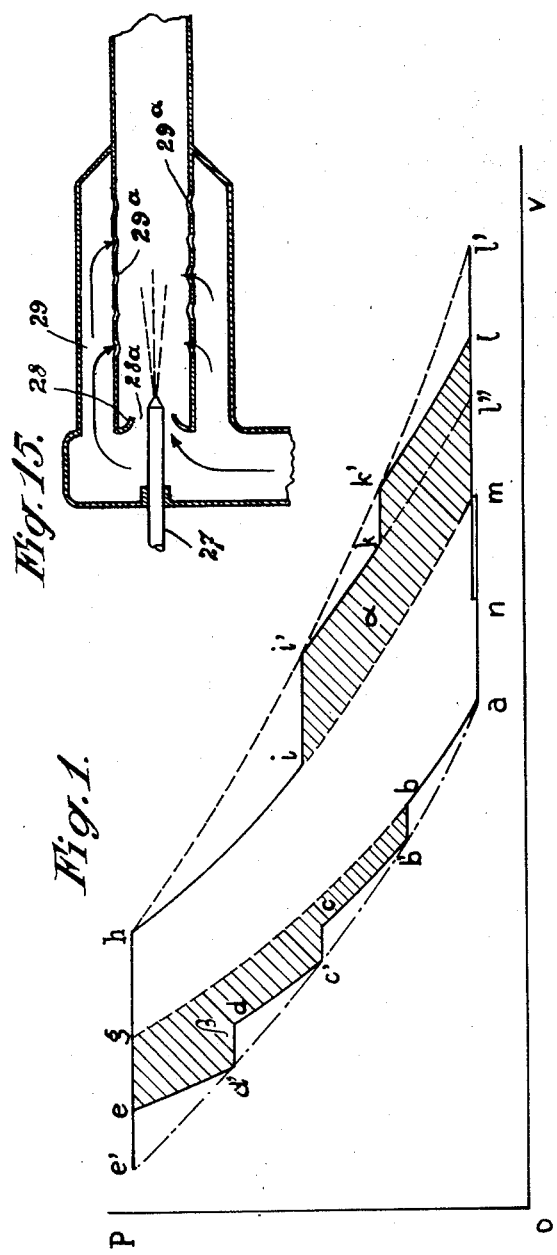
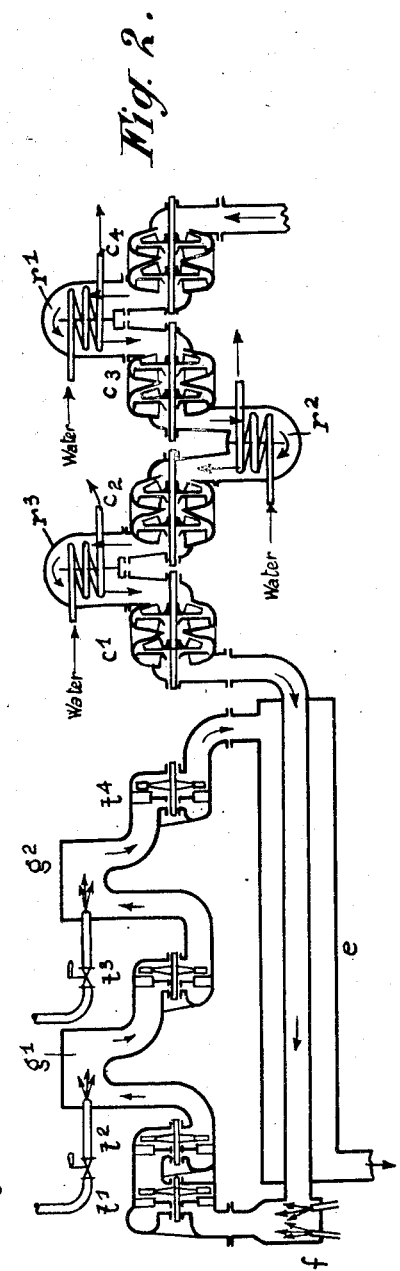
Inventors:
René Anxionnaz + Roger Imbert
By Mauro + Lewis
Attorneys

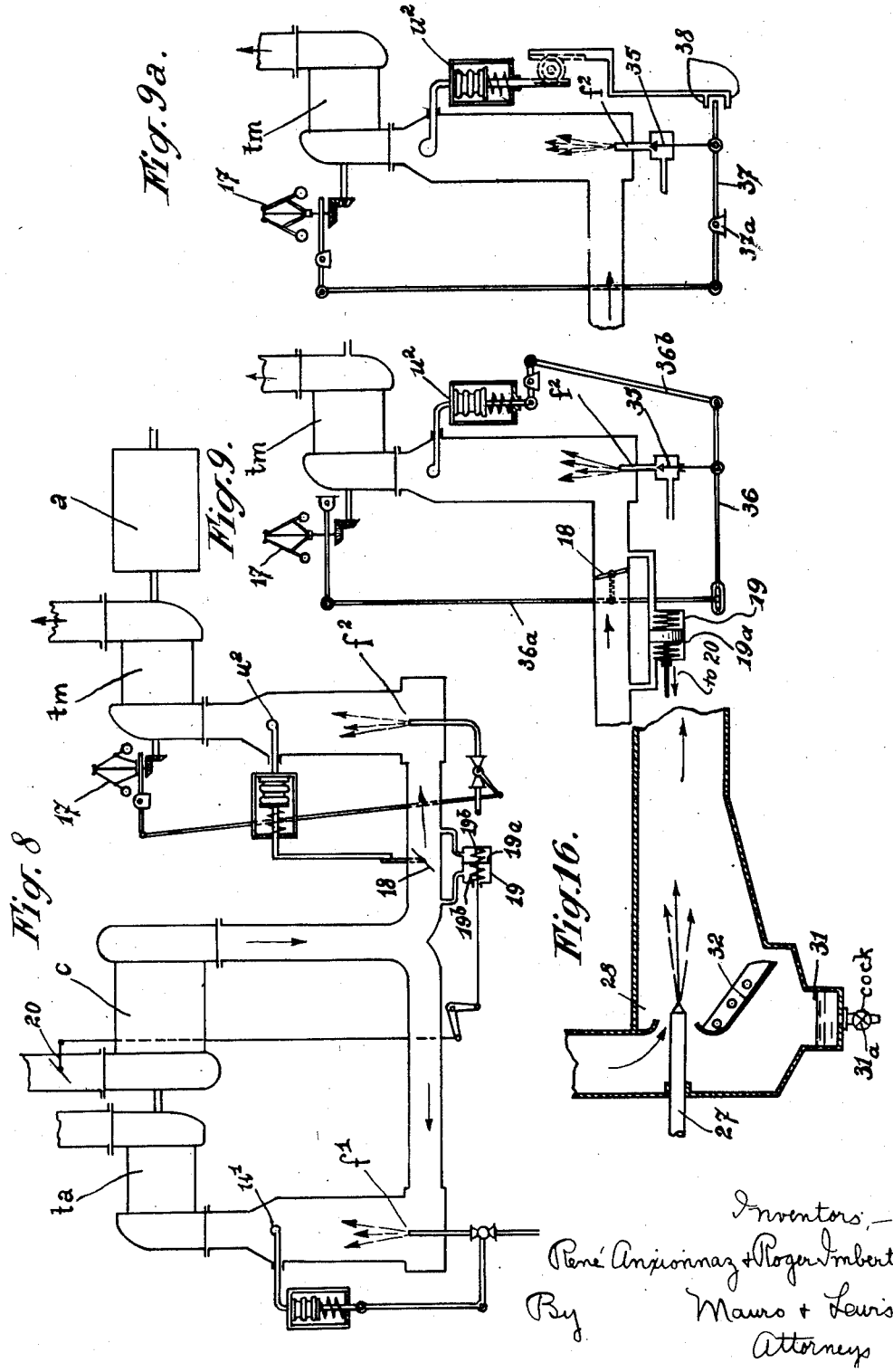

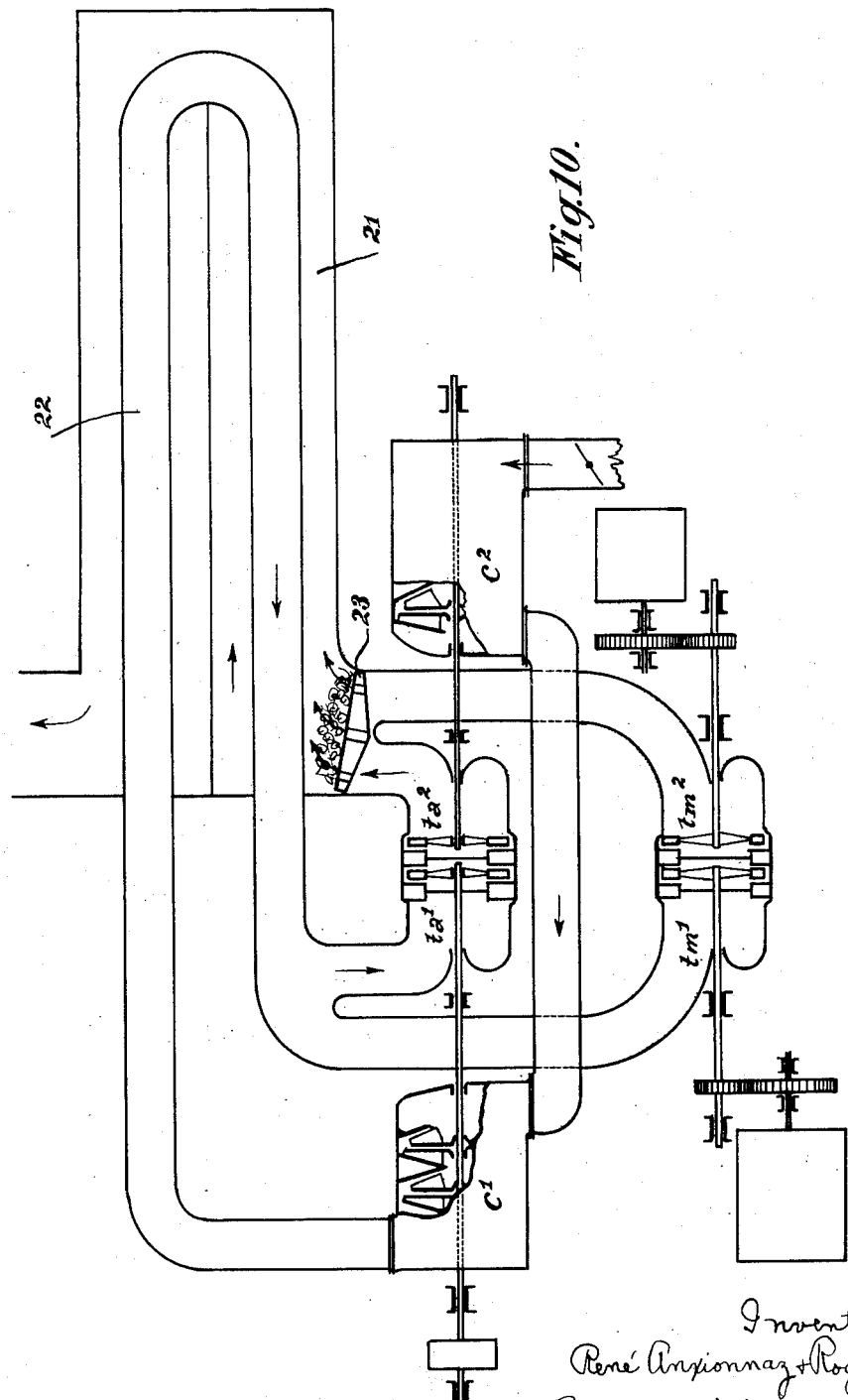

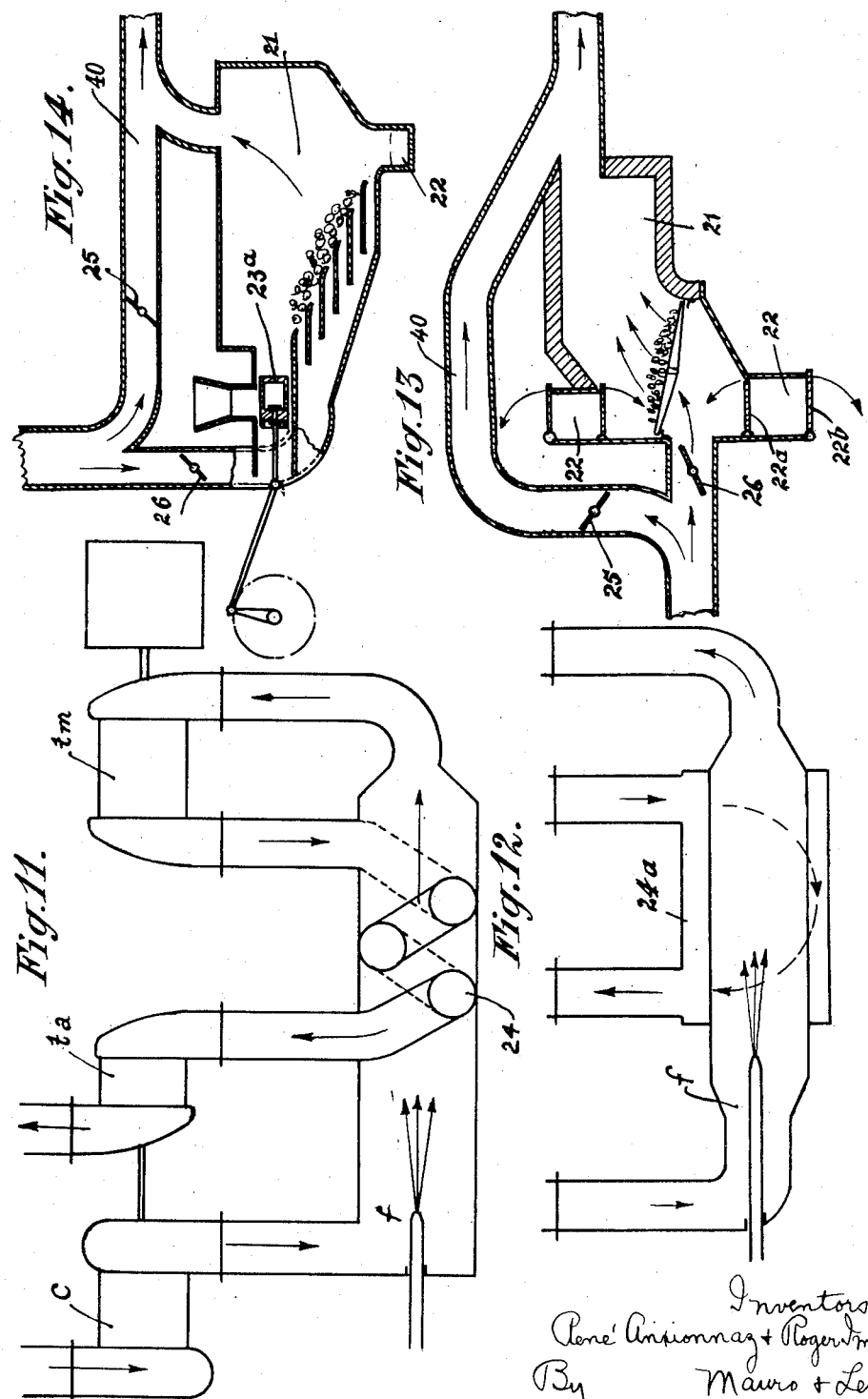

Patented Apr. 21, 1942

2,280,765

UNITED STATES PATENT OFFICE 2,280,765

GAS TURBINE THERMIC ENGINE

René Anxionnaz, Paris, and Roger Imbert, Mantes, France, assignors, by direct and mesne assignments, of one-half to said René Anxionnaz and one-half to Societe Rateau, Paris, France, a company of France Application December 8, 1936, Serial No. 114,842
In France December 9, 1935

6 Claims. (Cl. 60—41)

It is well known that one of the drawbacks of gas turbine plant resides in the difficulty of maintaining the efficiency at a convenient value at the same time as the load is varied.

The present invention has for its object to provide a combustion gas turbine plant wherein special arrangements have been devised for obtaining a good efficiency and for maintaining it as far as possible whilst the working conditions are varied between wide limits.

The turbine plant embodies the following arrangements:

(a) A working cycle comprising a compression made in one or several stages, (with or without intermediate cooling), a heating at constant pressure, and an expansion which is made in one or several stages.

(b) A recovery of the heat of the expanded gas for the purpose of preheating the air after its compression but before its heating by combustion.

(c) Driving the compressor or compressors by means of one or more gas turbines designated as auxiliary turbines as distinct from the main turbines or motive turbines which drive the working machine or machines.

With the object of increasing the efficiency when the expansion of the gas is sufficiently important, the cycle may be improved by intermediate reheating between the different expansion stages of the gas.

Contrary to the opinion generally admitted the employment of this reheating does not always lead to an increase of the efficiency.

One of the features of the present invention therefore consists in putting the reheating process into or out of operation according to the existing load conditions, in order to obtain for every load condition an efficiency as high as possible.

If the installation comprises a number of reheating stages then the full driving operation will be realised with all the reheating stages functioning, operation with more reduced load will be carried out by dispensing with the last reheating stage and so on down to the operation on minimum load where only the first reheating stage is in service.

Another object of the invention is to obtain a correct distribution of the power between the motive turbines and the auxiliary turbines when the load is varying.

In fact, for the lower running conditions for instance, the power necessary for the compression of the air increases relatively to the power available in the motive turbines.

The correct distribution may be obtained according to the present invention, when the motive turbines are coupled in parallel with the auxiliary turbines, by means of supplementary motive turbines, hereinafter referred to as "cruising turbines" or "low load turbines," and which are coupled in series with the main motive turbines with the object of realising a satisfactory mode of operation at low load.

For example, let us consider an arrangement wherein various motive turbines are coupled in parallel with a certain number of auxiliary turbines driving compressors and arranged in such a fashion that there is equilibrium of power when operating according to a determined regime, for example operation at full load. Now if we place in series with the main turbines one or more reduction turbines of smaller section, the arrangement will thus be found to be in equilibrium for a new motive power which will be sensibly smaller than the preceding.

When a number of low load turbines are added in succession, we may therefore realise a number of different modes of operation at low load.

For a large output of power on the contrary, one or more supplementary low pressure compressors may be adjoined which are driven by one or more supplementary low pressure turbines arranged in series either with the auxiliary turbines alone or with the auxiliary turbines and the motive turbines at the same time.

Still another object of the invention is to provide means for regulating the power of a set of gas turbines some of which drive the compressors (auxiliary turbines) whereas the others drive the working machine (motive turbines).

Various embodiments of the present invention (which are given merely by way of example) will be hereinafter described, with reference to the accompanying drawings.

In the accompanying drawings:

Fig. 1 is a $p$—$v$ diagram illustrating the new cycle of operation of gas turbine plant, with reheating during the expansion;

Fig. 2 is a diagrammatic view of a plant working on this cycle;

Figs. 7 and 8 show diagrammatically two embodiments of a method of control (according to the invention) comprising thermostatic means;

Figs. 9 and 9a show alternative methods of control;

Fig. 10 is a diagrammatic view showing the heating of the gases by an external furnace burning solid fuel;

Figs. 11 and 12 show the reheating of the gases by means of a surface arrangement, employing the main burner;

Figs. 13 and 14 show two kinds of internal furnaces for solid fuel which may be employed for the heating (or the reheating) of the gases;

Fig. 15 shows a burner with annular circulation for cooling the walls and the gases;

Fig. 16 shows a combustion chamber adapted to avoid re-ignition of the fuel that has not been burned;

The various figures show modifications of different parts of Fig. 3 and are to be substituted to the corresponding parts thereof.

Figure 3:
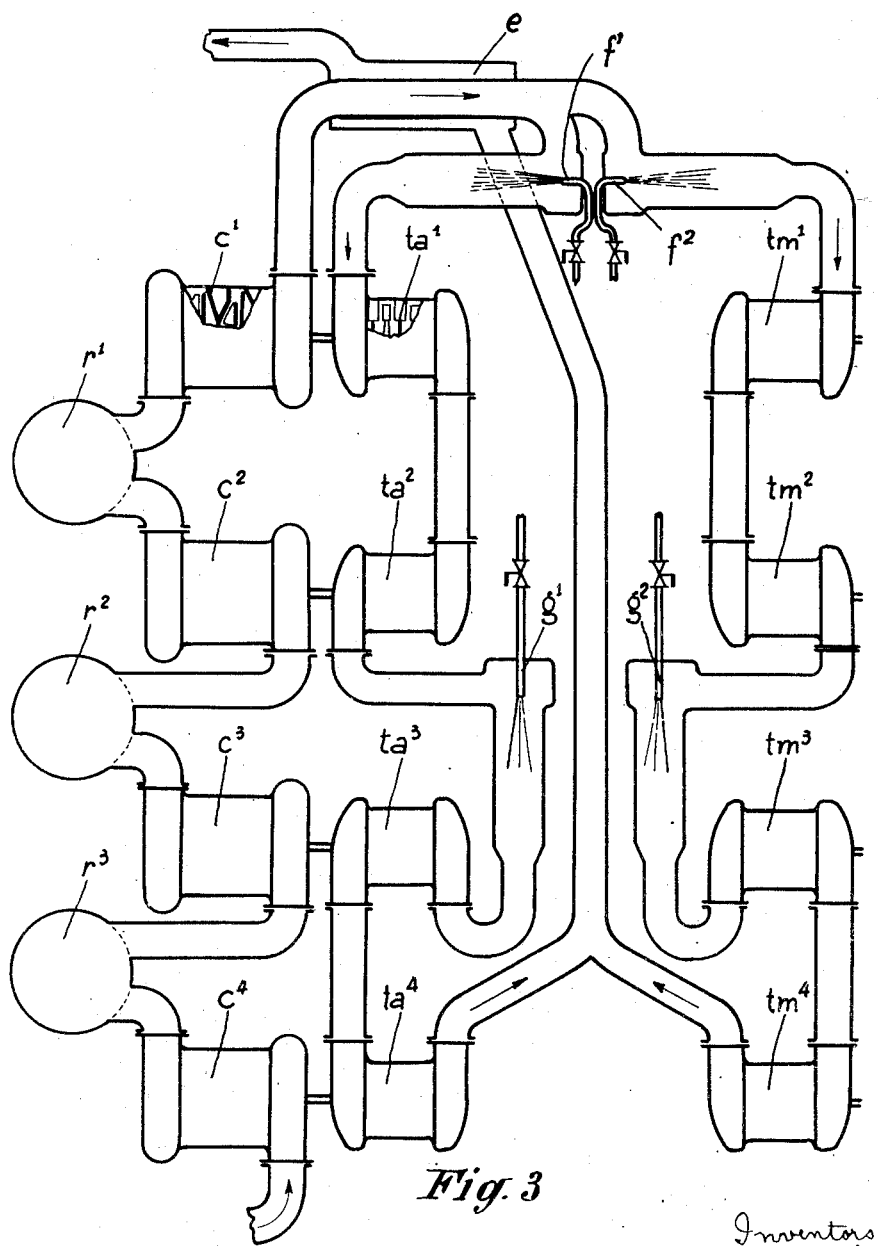
Fig. 3 shows diagrammatically a turbine plant in which compressors are driven by auxiliary turbines distinct from the motive turbines, the auxiliary turbines being coupled in parallel.

It is known that the useful work that can be supplied by a certain mass of gas at pressure $p$ and temperature $t$ is equal to the expansion work of this gas between pressure $p$ and the atmospheric pressure, less the compression work absorbed by the corresponding amount of air from atmospheric pressure to pressure $p$.

On the other hand, the maximum temperature $t$ and the maximum pressure $p$ to which the gases must be brought, being limited by the temperature and the pressure that the parts of the turbine can support without injury, it follows that, in order to increase the useful work, it is necessary to increase the expansion work by means of intermediate reheatings, in such manner as to be as near as possible to the isothermal expansion. Or it may be necessary to reduce the compression work by means of intermediate coolings so as to come as near as possible to isothermal compression. Or again both of the preceding steps may be combined. This may be seen clearly from an examination of Fig. 1 in which curves $a$—$g$ and $h$—$m$ represent compression and adiabatic expansion such are employed in existing engines and $a$—$e'$ and $h$—$l'$ represent compression and isothermal expansion corresponding to the limit that can be reached in a perfect engine.

Two reheatings between the expansion stages, are represented by horizontal lines $i$—$i'$, $k$—$k'$. It is clear that there is a gain corresponding to the work represented by cross-hatched area $\alpha$. Coolings between the stages of compression which may be utilized in combination with the reheatings are likewise represented (being three in number in the example that is shown) by horizontal portions $b$—$b'$, $c$—$c'$, $d$—$d'$; the gain corresponds to the cross-hatched area $\beta$.

To sum up, isothermal expansion and compression have been more closely approximated and, theoretically, the result seems to be the more complete as the number of stages is increased.

However, the increase of the useful work supplied by a certain mass of gas does not necessarily correspond to an increase of the thermal efficiency when it is obtained by reheating in the expansion. This is due to the fact that in this case the amount of heat supplied to the gas for bringing it to temperature $t$ under pressure $p$ must be increased by that necessary for the reheating and there will be an increase in the efficiency only if the ratio of the excess of work produced to the excess of heat supplied is greater than the efficiency without reheating.

This is the reason why the use of reheating alone between the stages of the fractional expansion is rather limited even if the expansion ratio is sufficiently large.

On the contrary, when reheating is employed in combination with a heat recuperator which permits of reheating the compressed air by making use of a part of the calories still contained in the exhaust gases, a portion of the heat necessary for the reheating is recuperated and is to be subtracted from that necessary to the heating by the first combustion furnace. In this way reheating becomes an advantageous operation even for a lower ratio of expansion.

One of the features of the invention consists in obtaining an improvement in the efficiency when the mode of operation varies between certain limits in a gas turbine plant comprising one or preferably a plurality of reheating stages by placing the reheating stages in or out of service as required in a judicious manner.

For a heavy load where the expansion ratio is large in all the turbines all the reheating stages are in service. When the load diminishes the expansion ratio of the lower turbine falls more quickly than of the others and reaches the value at which the use of reheating no longer results in an improvement of the efficiency. At this point the reheating is cut out.

When the load falls still more the expansion ratio of the last but one turbine eventually arrives at a point below the value at which reheating is no longer useful; at this point reheating is therefore omitted, and this procedure may be followed until only the first burner remians in service.

This is the principle of the improved cycle of operation which constitutes one of the objects of the invention.

Fig. 2 shows diagrammatically a plant working according to the cycle of Fig. 1. We have shown at $c^1$, $c^2$, $c^3$, $c^4$ four staged compressors, through which the gases flow in series (said gases consisting of air drawn from the atmosphere). Between each two successive compressors are mounted coolers $r^1$, $r^2$, $r^3$ (for instance water circulation coolers). The compressed gas then flows through the recuperator $e$ through the other circuit of which the exhaust gases are flowing. The gas is then heated by a suitable source of heat $f$, consisting, in the example shown, of one burner effecting the combustion of a liquid or gaseous fuel (oil such as Mazut). It expands a first time by flowing through two turbines $t^1$ and $t^2$ mounted in series.

After this initial expansion it is reheated at $g^1$ for operation at full load, for example by means of a separate burner which may be a Mazut burner or a solid fuel burner. It then undergoes a second expansion in the turbine $t^3$ and is reheated afresh at $g^2$ and it finally expands in the turbine $t^4$ and exhausts after traversing the exchanger $e$. For an average load the reheating at $g^2$ is omitted, and for reduced load the reheating at $g^1$ is also omitted.

Fig. 3 shows the case of a plant in which the compressors of the various stages $c^1$, $c^2$, $c^3$, $c^4$ are driven by gas turbines $ta^1$, $ta^2$, $ta^3$, $ta^4$, which will be hereinafter called auxiliary turbines and which are distinct from the main driving turbines (motive turbines) $tm^1$, $tm^2$, $tm^3$, $tm^4$ (the latter supply the mechanical energy required from the plant). The flow of gases having passed through the stages of compression and, eventually, preheating through exchanger $e$, is divided into two streams, heated respectively by burners $f^1$, $f^2$ and feeding in parallel, on the one hand the auxiliary turbines and, on the other hand the driving turbines. The auxiliary turbines are themselves mounted in series and the same arrangement is used for the driving turbines.

Between the turbine $ta^2$ and $ta^3$ and/or $tm^2$ and $tm^3$ the gas may be reheated by the burners $g^1$, $g^2$.

At full load all the burners are in operation, while at reduced load only burners $f^1$ and $f^2$ are in use.

Figure 4:
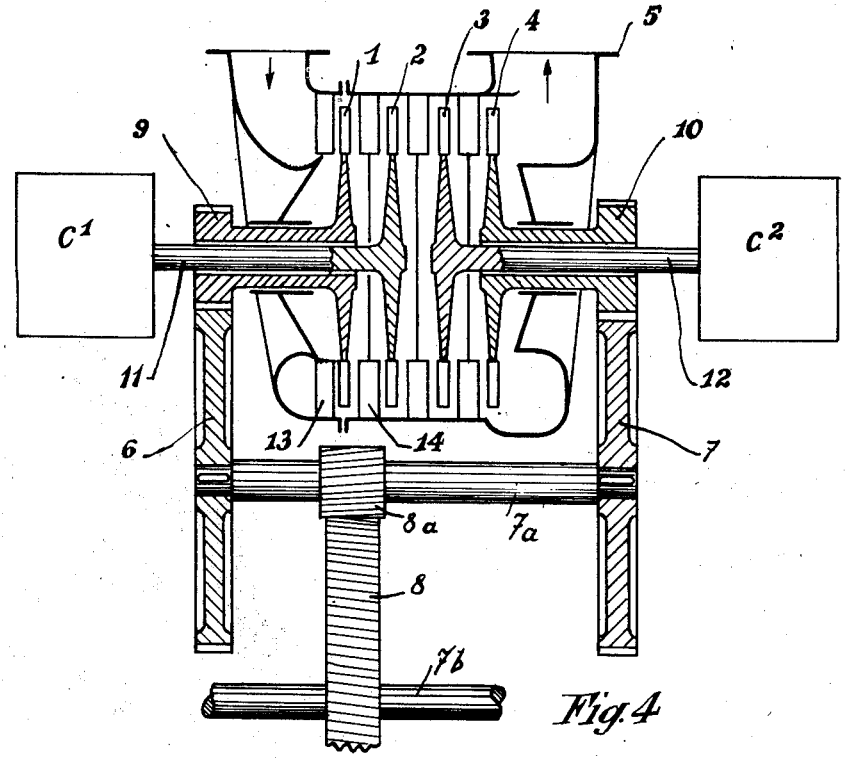
Fig. 4 shows two embodiments of the grouping of two or more turbines in a common casing or body.

Two or more turbines, whether they are auxiliary turbines or driving turbines, may be grouped together in a single casing. By way of example, Fig. 4 shows four turbine wheels 1, 2, 3, 4 mounted in a common casing or cylinder 5.

Between the successive wheels are rows of stationary blades such as 13 and 14.

Wheels 2, 3 respectively drive the compressors $c^1$, $c^2$, whereas wheels 1 and 4 mounted on concentric shafts with respect to shafts 11 and 12 which carry wheels 2 and 3, are respectively connected through the pairs of gears 9, 6 and 10, 7 with a shaft 7a which drives the final shaft 7b on which the power is collected, through the intermediate of the couple of gears 8a and 8.

The starting of a gas turbine plant according to the invention including several turbines in series may take place gradually, from one element to the next one, as it will be hereinafter described with reference to Fig. 5, which shows by way of example one of the arrangements that can be used for this purpose.

Before each compressor, there is provided an inlet valve, such as $s^1$, $s^2$, etc., and behind each turbine there is provided an outlet valve $v^1$, $v^2$, etc. Valve $s^1$ enables the corresponding compressor to draw in air from the atmosphere directly without passing through the compressor disposed before it. Valves $v^1$, etc., operated at the desired time, allow each turbine exhaust to lead directly into the atmosphere, without passing through the next turbine.

These valves $v^1$, $v^2$, etc. are closed, for instance manually, when the pressure is sufficiently high.

One of the groups, such as $ta^1$, $c^1$ will first be started (this group being preferably that corresponding to the highest pressure), by opening the first valve $v^1$, and then feeding to turbine $ta1$, through cock 15 the compressed air from a reservoir 16. The source of heat $f$ permits an independent working of this group once it is started.

Once the group is working, valve $v^1$ is closed and the air pressure supplied by the group will permit of starting the next group $ta^2$, $c^2$, and so on. When all the auxiliary groups are working, the driving turbines may be started.

Valve 15a serves to disconnect the auxiliary turbines $ta^1$, $ta^2$, $ta^3$ from the motive turbines $tm^1$, $tm^2$, $tm^3$ during the starting of the auxiliary turbines. It is closed during the starting and as soon as advisable it is opened for starting also the motive turbines $tm^1$, $tm^2$, $tm^3$.

Figure 5:
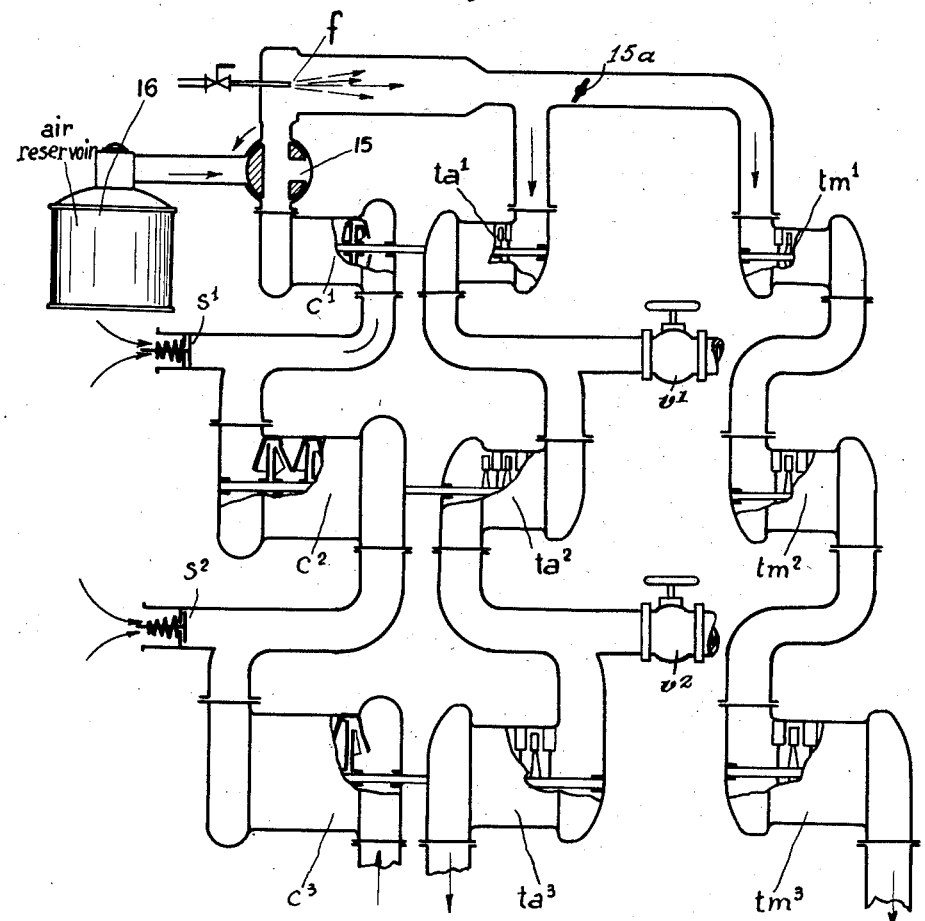
Fig. 5 shows a system of valves which may be employed, according to the present invention, in the gradual starting of the turbines.
Figure 6:
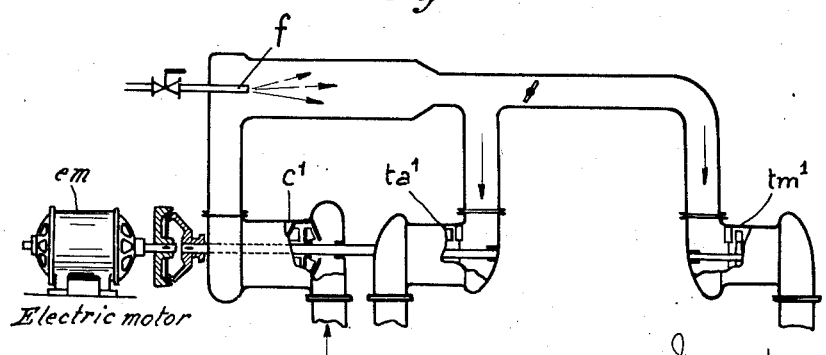
Fig. 6 shows a part of Fig. 5 in another embodiment.

Instead of compressed air any other starting means, such as electric motor $e_m$ or the like shown on Fig. 6 which is a modification of a part of Fig. 5 may be employed.

One of the chief difficulties in the use of gas turbines being the adjustment of the temperature, the present invention includes the optional provision, for the control of the plant, of thermostatic regulating devices (slow regulation) located at one or several points of the circuit of the gases and acting in conjunction with another means of control (instantaneous regulation).

Figure 7:
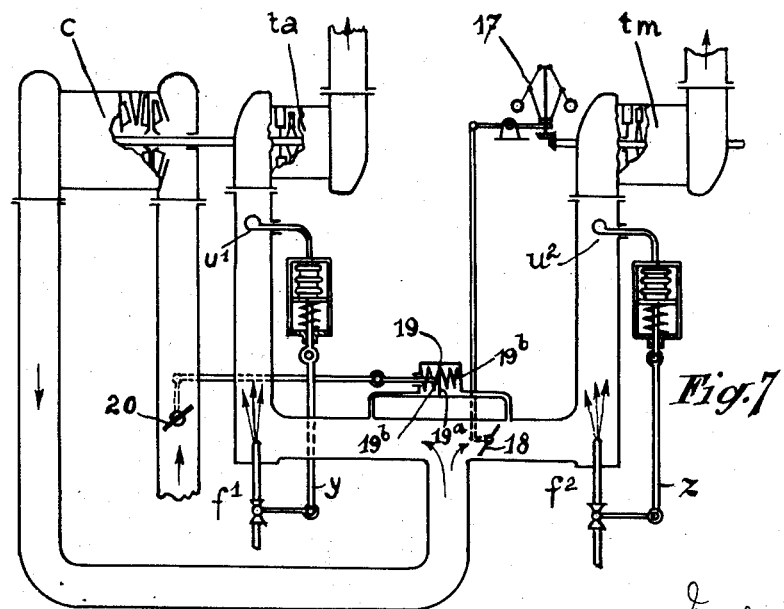

We will now describe with reference to Fig. 7 a control arrangement wherein the control is effected in two stages, namely; a quasi-instantaneous control produced by the power governor of the turbine and a slow regulation controlled by the thermostat. In Fig. 7 the governor 17 of the motive turbine $tm$, which in this case is a speed governor, controls the valve 18 which influences the pressure of the air flowing to the burner $f^2$ and to the said motive turbine. If the speed of the turbine $tm$ tends to increase, the governor 17 tends to close the valve 18; thereby is obtained a speed control which is almost instantaneous. But the pressure supplied by the compressor is now too great. It is returned to the desired value by means of the thermostats $u^1$ and $u^2$ which control the admission of the combustible (slow regulation). When the valve 18 is being closed, for instance, the difference between the pressures existing on its two faces tends to increase. This difference of pressure acts on the differential manometric device 19. This device, as shown, comprises a piston 19a which is urged toward middle position by opposite springs 19b when the pressure is the same on both sides of said piston. An increase of the pressure on one of the sides of this piston 19a, for instance on the left-hand side, as a consequence of the closure of valve 18, produces a displacement of this piston toward the right, proportionally to the value of this rise of pressure. This displacement is transmitted to valve 20, which closes. The delivery of compressor $c$ decreases and the pressure drops on the left hand side of valve 18 until there is an equal pressure on both sides of said valve and, also on both sides of piston 19a, which then comes back into its median position. At the same time the thermostats $u^1$ and $u^2$ have reduced the quantity of combustible supplied respectively to the burners $f^1$ and $f^2$, because the flow of air being diminished, its temperature will tend to increase. In this manner there is established a new state of equilibrium which corresponds to the new mode of operation.

In the embodiment described, the manometric device will keep at a constant value the difference between the pressures on the two respective faces of valve 18. On the contrary this device can be arranged in such manner as to vary said difference according to a given law, as a function of the absolute pressure ahead of the valve 18. This compensating device may, for instance, consist of a piston assembled to that of the manometric device and on which acts the pressure of the gas in the pipe above the valve 20.

According to Fig. 8 the speed governor 17 of the driving turbine $tm$ acts on the inflow of fuel to the burner $f^2$ of this turbine; at the same time, the thermostat $u^2$ acts on the valve 18 for restoring to its correct value the amount of air sent to the burner $f^2$ whereas the valve 20 acting on the air admitted to the compressor is controlled, as above, by the differential device 19 subjected to the difference of the pressures existing on the two respective faces of valve 18.

In a second arrangement, the thermostats act on the same members as the normal governors (or on the control system of these members) in such manner as to limit or reduce the displacement thereof so as to keep the temperature within given limits.

An embodiment of this kind has been shown in Fig. 9. The governor 17 and the thermostat $u^2$ both act on the fuel inlet valve 35, their actions on this valve being combined through a cantilever 36. The ends of this lever are connected respectively to the speed governor 17 and to the thermostat $u^2$ by means of spindles $36^a$, $36^b$.

If the speed of turbine $tm_1$ had decreased, regulator or governor 17 moves cantilever 36 in a downward direction, which opens the fuel inlet 35. The thermostat $u^2$ acts as a stationary element in this movement of cantilever 36. The temperature tends to increase and, as the thermostat $u^2$ expands, pulls through lever $36b$ cantilever 36 which tends to close the fuel inlet.

The opposed actions of governor 17 and thermostat $u^2$ are thus combined by cantilever 36. The action of governor 17 is however preponderating, due to the fact that it is connected to the arm of cantilever 36 which is longer than that connected to thermostat $u^2$.

This thermostat acts chiefly to limit the inlet of fuel and to avoid the rise of temperature above a maximum value dangerous for the turbine.

In the alternative of Fig. 9a the normal governor 17 acts on the fuel inlet valve 35 through a lever 37. This lever swings round the bearing $37^a$. The movement of one of its ends is limited by the stops 38, the position of which is under the control of the thermostat $u^2$. The operation is analogous to that of the embodiment of Fig. 9.

If the speed of turbine $tm$ decreases the speed governor 17 tends to rotate the lever 37 in the clockwise direction and thus to open the inlet valve 35 of the fuel. But the rotation of the lever 37 and consequently the opening of the valve 35 is limited by the lever 37 abutting against the lower stop 38, the position of which is fixed by the temperature of the gases by means of the thermostat $u^2$.

If, on the contrary, the speed of turbine $tm$ increases, the governor tends to rotate the lever 37 in the opposite direction and thus to close the inlet valve 35. The closing of this valve is limited by the lever 37 abutting against the upper stop 38.

Figures 9 and 9a show only the part of the plant which comprises the motive gas turbine $tm$ and the device associated with said turbine. The auxiliary turbine (not shown) is coupled in parallel arrangement with the motive turbine $tm$ in the circuit of the gas delivered by the compressor, as described with reference to Figs. 7 and 8.

A valve 18 may be provided in the same manner as in the embodiment of Fig. 7 for regulating the pressure and the flow of the air fed to the burner $f^2$ and to the motive turbine $tm$, while the air flows directly to the burner $f^1$ and to the auxiliary turbine $ta$ as shown in Fig. 7. The valve 18 may be operated automatically by the speed governor 17 by means of the spindle $36a$ in the same manner as in Fig. 7. A differential manometric device 19 operated by the difference between the pressures existing on the two faces of the valve 18 may be provided for controlling the valve 20 arranged at the suction of the compressor $c$.

The operation of the valve 18 and of the manometric device 19 is the same as described with reference to Fig. 7. When the load increases, the speed of the motive turbine $tm$ decreases and the speed governor tends to open the valve 18 and the fuel inlet 36. The difference of the pressures between the two faces of the valve 18 tends to decrease and the piston $19a$ of this device tends to open the inlet valve 20 of the compressor, thus increasing the flow of air in the said compressor. The thermostat $u^2$ actuated by the temperature of the gases corrects the position of the inlet valve 35 of the fuel.

The operation is inverted when the load decreases.

The temperature of the gases flowing to the auxiliary turbine may be regulated by a thermostat $u^1$ as described with reference to Fig. 1.

According to Fig. 10, the heating of the gases prior to expansion is obtained by means of an external furnace 21 in which is provided a surface heater 22 through which pass the gases coming from the compressors $c^1$, $c^2$ and intended to be sent to the turbine or turbines. The air exhaust from the turbines may be sent under the grid 23 of the furnace, in order to contribute to the feed of the furnace with hot air, which permits of recuperating a portion of the calories it contains and of eliminating any other draft arrangement.

The heating by external furnace might also be utilised between the expansion stages.

For this reheating, one may also make use of the heat from the source used for the first heating of the compressed gases (external furnace or internal combustion burners) prior to their admission into the turbine, as shown by way of example by Figs. 11 and 12.

In Fig. 11, burner $f$, which serves to perform the first heating of air coming from compressor $c$ and going to turbine $tm$, also serves to the reheating of the gases escaping from turbine $tm$ and going to turbine $ta$.

For this purpose, a coil-shaped tube 24 is inserted in the path of the gases between turbine $tm$ and turbine $ta$ and it is located in the chamber which contains burner $f$, in such manner that the gases flowing through this coil are heated by the burner.

The arrangement of Fig. 12 is analogous to that of Fig. 11, but coil 24 is replaced by a sleeve $24a$ surrounding the burner chamber.

The heating (or the reheating) of the gases may also be effected as shown in Figs. 13 and 14 by means of a solid fuel furnace 21 interposed across their path, and working consequently under pressure.

The fuel is introduced into the furnace and the ashes removed, for instance by means of a system 22 including two gates $22a$, $22b$ or any other device avoiding losses of gas to the outside. The feed may also be mechanically operated for example by means of a push piston $23a$ (Fig. 14) or of any other devices.

A bypass 40 and a system of valves 25 and 26 permits of regulating the temperature of the gases.

A similar arrangement can also be adopted if the heating of the gases (or the reheating) is effected by means of burners making use of liquid or gaseous fuel.

In the modification shown in Fig. 15 the chamber 28, in which the combustion takes place and which receives only a portion of the air through an orifice $28a$ coaxial with the burner is surrounded by an envelope 29 forming with said chamber an annular space. In this space flows the excess of air, which is subsequently mixed with the combustion gases by passing through the holes $29a$ in the envelope 29. This arrangement has the advantage of creating a circulation of relatively cold air in the vicinity of the external and internal walls of the casing 29 of the combustion chamber. The chamber is therefore cooled and it is possible for this reason to reduce or even to omit the refractory coating and the heat insulation.

Fig. 16 shows a combustion chamber of the liquid fuel burner type in which there is provided, at the lower part, and preferably at the rear of the combustion chamber 28, a chamber 31 provided or not with a discharge device 31a and intended to collect the liquid fuel that is not burnt. We can thus prevent this fuel from igniting as a mass and avoid the dangers of explosion that would result therefrom. Screens such as 32 completed, if necessary, by any well-known antideflagrating device as may be provided for protecting the fuel that is not burnt against the heat produced by the burner or burners.

What we claim is:

1. In a gas turbine plant of the type described, the combination of a compressor having an inlet opening for the inflow of the gas to be compressed, a gas turbine driving said compressor, a gas turbine for producing useful power, means for heating the gas delivered by said compressor, means for feeding that gas in parallel circuits to said first-named and second-named turbine, a speed governor driven by the second-named turbine, a valve for controlling the distribution of the gas between said parallel circuits, means responsive to said speed governor and acting on said valve, a manometric device operated by a difference of pressures, means for transmitting to said device the pressures existing on one side and on the other of said valve, a valve for controlling the inflow of the gas to said compressor, and means responsive to said device and acting on said last-named valve.

2. In a gas turbine plant of the type described, the combination of a compressor, an auxiliary gas turbine coupled with said compressor, power producing means including a motive gas turbine, means for feeding the gas supplied by said compressor in two parallel streams to said turbines, respectively, means for controlling the pressure of the gas stream fed to said power producing means including a valve for controlling the distribution of the gas supplied by said compressor into said two streams, respectively, and adjustable means for heating the stream on its way from said valve to said power producing means, means responsive to the speed of said power producing means for acting on said valve in immediate response to variations of the output of said power producing means, means responsive to the temperature of the heated gas supplied to the power producing means for varying the action of said heating means in response to variations of the said temperature, means for controlling the inflow of gas to said compressor, and means, responsive to the pressures existing on the opposite sides of said valve, for operating said compressor gas inflow controlling means to reduce said inflow when the difference between the pressure of the gas stream to the power producing means and the pressure of the other gas stream increases.

3. In a gas turbine plant of the type described, the combination of a compressor, an auxiliary gas turbine coupled with said compressor, power producing means including a motive gas turbine, means for feeding the gas supplied by said compressor in two parallel streams to said turbines, respectively, means for controlling the pressure of the gas stream fed to said power producing means including a valve for controlling the distribution of the gas supplied by said compressor into said two streams, respectively, and adjustable means for heating the stream on its way from said valve to said power producing means, a speed governor driven by said motive turbine for acting on said valve in immediate response to variations of the speed of said motive turbine, slow acting thermostatic means for varying the action of said heating means in response to variations of the temperature of said heated gas stream flowing to said power producing means, means for controlling the inflow of gas to said compressor, and means, responsive to the differential pressures existing on the opposite sides of said valve, for operating said compressor gas inflow controlling means to reduce said inflow when the difference between the pressure of the gas stream to the power producing means and the pressure of the other gas stream increases.

4. In a gas turbine plant of the type described, the combination of a compressor, an auxiliary gas turbine coupled with said compressor, power producing means including a motive gas turbine, means for feeding the gas supplied by said compressor in two parallel streams to said turbines, respectively, means for heating said gas, including a fuel burner for feeding fuel to the gas stream fed to the motive turbine and a burner for feeding fuel to the gas stream fed to the auxiliary turbine, a speed governor driven by said motive turbine, a thermostat responsive to the temperature of the heated gas stream fed to said motive turbine, a second thermostat responsive to the temperature of the heated gas stream fed to said auxiliary turbine, a valve operative by said speed governor for controlling the distribution of the gas supplied by said compressor into said two streams, respectively, means operated by said thermostats for controlling the fuel deliveries of the corresponding burners, respectively, means for controlling the inflow of gas to said compressor, and means, responsive to the differential pressures existing on the opposite sides of said valve, for operating said compressor gas inflow controlling means to reduce said inflow when the difference between the pressure of the gas stream to the motive turbine and the pressure of the gas stream to the auxiliary turbine increases.

5. In a gas turbine plant of the type described, the combination of a compressor, an auxiliary gas turbine coupled with said compressor, power producing means including a motive gas turbine, means for feeding the gas delivered by said compressor in two parallel streams to said turbines, respectively, means for controlling the pressure of the gas stream fed to said power producing means including a valve for controlling the distribution of the gas supplied by said compressor into said two streams, respectively, means for heating the stream on its way from said valve to said power producing means, other means for heating the stream supplied to the said auxiliary turbine, means for controlling the inflow of gas to said compressor and means responsive to the differential pressures existing on the opposite sides of said valve for operating said compressor gas inflow controlling means, to reduce said inflow when the difference between the pressure of the gas stream to the power producing means and the pressure of the other gas stream increases.

6. In a gas turbine plant of the type described, the combination of a compressor, an auxiliary gas turbine coupled with said compressor, power producing means including a motive gas turbine, means for feeding the gas supplied by said compressor in two parallel streams to said turbines, respectively, means for heating said streams, a speed governor driven by said motive turbine, a thermostat responsive to the temperature of the gas stream fed to said motive turbine, a second thermostat responsive to the temperature of the gas stream fed to said auxiliary turbine, means responsive to the last-named thermostat for controlling the temperature of the heated gas stream fed to said auxiliary turbine, and means responsive to the first-named thermostat and the said governor, respectively, for controlling both the temperature and the pressure of the heated gas stream fed to said motive turbine.

RENÉ ANXIONNAZ.
ROGER IMBERT.